(12) United States Patent
Chung

(10) Patent No.: US 6,943,285 B2
(45) Date of Patent: Sep. 13, 2005

(54) BIPOLAR DISCHARGE-DISSIPATION LIGHTNING AIR TERMINALS

(76) Inventor: Young-Ki Chung, 102-1404, Samsung Apt., 374, Dangsan-dong, Yeongdeungpo-gu, Seoul (KR), 150-040

( * ) Notice: Subject to any disclaimer, the term of this patent is extended or adjusted under 35 U.S.C. 154(b) by 322 days.

(21) Appl. No.: 10/339,460

(22) Filed: Jan. 10, 2003

(65) Prior Publication Data
US 2004/0105211 A1 Jun. 3, 2004

(30) Foreign Application Priority Data
Dec. 2, 2002 (KR) ............................... 10-2002-0076020

(51) Int. Cl.[7] .............................................. H02G 13/00
(52) U.S. Cl. ........................... 174/3; 174/4 R; 361/220
(58) Field of Search ............................. 174/1, 2, 3, 4 R, 174/5 R, 5 SG, 6, 7; 361/216, 219, 220, 222; D10/105

(56) References Cited

U.S. PATENT DOCUMENTS

| | | | |
|---|---|---|---|
| 1,122,326 A | | 12/1914 | Steinberger |
| 2,815,395 A | | 12/1957 | Donelli |
| 2,854,499 A | | 9/1958 | Carpart |
| 4,382,049 A | | 5/1983 | Hofmeister et al. |
| D305,104 S | | 12/1989 | Heary |
| 4,910,636 A | * | 3/1990 | Sadler et al. ............... 361/221 |
| D308,175 S | * | 5/1990 | Sulyma ...................... D10/105 |
| 5,073,678 A | * | 12/1991 | Carpenter, Jr. ................. 174/2 |
| 5,086,369 A | | 2/1992 | Lin |
| D339,306 S | * | 9/1993 | Fawthrop ................... D10/105 |
| D339,307 S | * | 9/1993 | Heary ....................... D10/105 |
| D361,289 S | * | 8/1995 | Fawthrop ................... D10/105 |
| 5,638,248 A | | 6/1997 | Fawthrop |
| 5,991,146 A | | 11/1999 | Bokhary |
| 6,369,317 B1 | * | 4/2002 | Rapp ......................... 174/5 R |
| D478,294 S | * | 8/2003 | Haygood ................... D10/105 |
| D478,295 S | * | 8/2003 | Haygood ................... D10/105 |
| D497,116 S | * | 10/2004 | Chung ....................... D10/105 |

* cited by examiner

*Primary Examiner*—Chau N. Nguyen
*Assistant Examiner*—Adolfo Nino
(74) *Attorney, Agent, or Firm*—Buchanan Ingersoll PC

(57) ABSTRACT

The present invention relates to a Bipolar Discharge-Dissipation Lightning Air-Terminals, and an object of the present invention is to disperse and discharge an earth charge following a thundercloud approach in a space according to electric dipole, bipolar and electric double layer principle. The above object of the present invention is achieved by providing the bipolar discharge-dissipation lightning air-terminals comprising: a base member fixed and installed in a top region of a protected object, including a coupling projection on whose inner periphery surface coupling screw grooves are formed, the coupling projection protruded and formed at a side of an upper surface of the base member, and a grounding piece formed at a side opposite to the coupling projection in order to earth a ground electrode and a grounded lightning wire; a discharge member coupled releasably to the base member, for focusing an earth charge following a thundercloud approach on the upper surface of the base member; and a potential modifying unit attached releasably on the discharge member so that the potential modifying unit is charged with different charges by electric dipole, bipolar and electric double layer principle according to the thundercloud approach to disperse and discharge the earth charge in a space separated from the discharge member.

19 Claims, 10 Drawing Sheets

PRIOR ART

BIPOLAR DISCHARGE-DISSIPATION LIGHTNING AIR TERMINALS

BIPOLAR DISCHARGE-DISSIPATION LIGHTING AIR TERMINALS

This application claims the priority of Korean Patent Application No. 2002-76020, filed Dec. 2, 2002, in the Korean Intellectual Property Office. The entire content of this application is incorporated herein by reference.

BACKGROUND OF THE INVENTION

1. Field of the Invention

The present invention relates to a bipolar discharge-dissipation (charge transfer system) lightning air-terminals, and more particularly to a bipolar discharge-dissipation (charge transfer system) lightning air-terminals which is fixed-mounted on a top of a protected building in order to disperse and discharge an earth charged charge following a thundercloud approach in a space thereby preventing the falling of a thunderbolt.

2. Description of the Related Art

In general, a quantity of electricity which is generated upon the falling of a thunderbolt due to a thundercloud approach is approximately one billion volts (V) of voltage and at tens of thousands amperes (A) of current. To safely induce an impulse current generated by such a falling of the thunderbolt to the earth, lightning air-terminals have been mounted on a top of protected buildings.

Such a lightning air-terminals is fixed-mounted on the top of the building to be protected and includes a supporting rod fixed to a fixed member having a grounded lightning conductor, a projected spine section fixed-connected to the supporting rod and an earth electrode buried under piped water sectors in the ground for safely inducing (discharging) the falling of thunderbolt to be absorbed via the projected spine section through the lightning conductor to the ground. In addition to the above type of lightning air-terminals, as disclosed in U.S. Pat. No. 5,638,248, various types of lightning air-terminals have been developed.

However, there was a problem that, though the above-described conventional lightning air-terminals completely absorbs the impulse current due to the falling of the thunderbolt and discharges it safely to the ground, because the impulse current due to the falling of the thunderbolt is very great as described above, electronics products, building telecommunication equipment, computers, light electrical appliances, etc. may be subject to an inductive disturbance generated by the falling of the thunderbolt, thereby malfunctioning or being not working.

SUMMARY OF THE INVENTION

Therefore, the present invention has been made in view of the above problem, and it is an object of the present invention to provide a bipolar discharge-dissipation lightning air-terminals for preventing the falling of a thunderbolt by discharging an earth charged charge following a thundercloud approach in a space on a top of a discharging member fixed on a protected building and decreasing an earth electric potential value to an electric field below a flashover voltage (FOV).

In accordance with the present invention, the above and other objects can be accomplished by the provision of a lightning air-terminals for dispersing and discharging the earth charged charge following the thundercloud approach in the space, comprising: a base member fixed and installed in a top region of a protected object, including a coupling projection on whose inner periphery surface coupling screw grooves are formed, the coupling projection protruded and formed at a side of an upper surface of the base member, and a grounding piece formed at a side opposite to the coupling projection in order to ground an earth electrode and a grounded lightning conductor; a discharge member coupled releasably to the base member, for focusing an earth charge following a thundercloud approach on the upper surface of the base member; and a potential modifying unit attached releasably on the discharge member so that the potential modifying unit is charged with different charges by electric dipole, bipolar and electric double layer action according to the thundercloud approach to disperse and discharge the earth charge in a space spaced from the discharge member.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
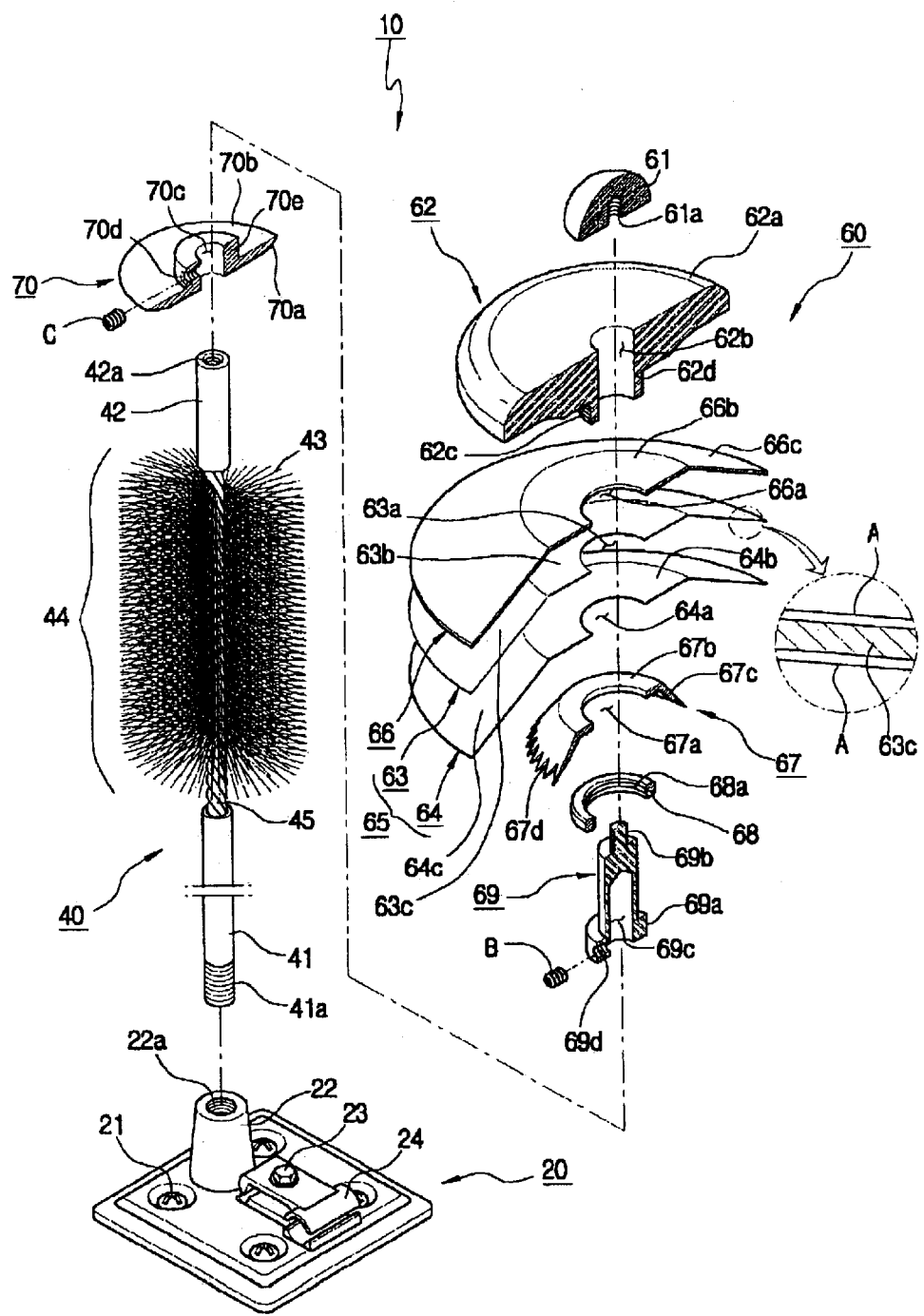
FIG. 1 is an exploded perspective view showing a partial half-section of a bipolar discharge-dissipation lightning air-terminals in accordance with a first embodiment of the present invention.

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Now, a preferred embodiment of the present invention will be described in detail with reference to the annexed drawings.

Before describing annexed drawings, it is noted that a basic concept of the present invention is to disperse and discharge an earth charge following a thundercloud approach in a space by including a potential modifying unit having a discharge cap part without contact with a discharge member by an upper cap member and an isolated (or floating) member fixed-connected to the top of the discharge member having a discharge part on whose outer periphery discharge pins are fixed-formed.

Now, a bipolar discharge-dissipation (charge transfer system) lightning air-terminals of the present invention having the above concept will be described with reference to the annexed drawings.

Figure 2:
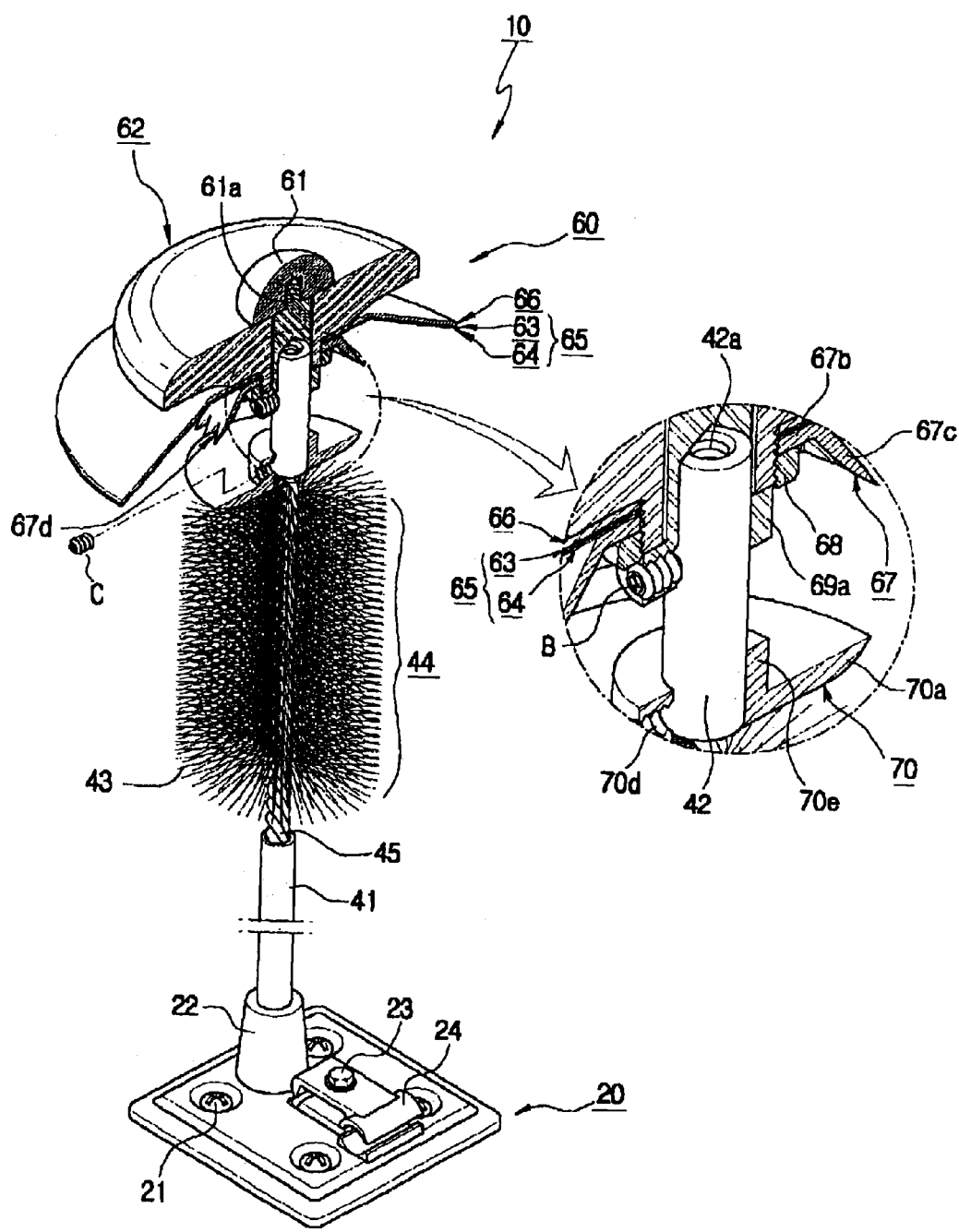
FIG. 2 is an assembled perspective view showing the partial half-section of the bipolar discharge-dissipation lightning air-terminals in accordance with the first embodiment of the present invention.

FIG. 1 is an exploded perspective view showing a partial half-section of a bipolar discharge-dissipation lightning air-terminals in accordance with a first embodiment of the present invention, and FIG. 2 is an assembled perspective view showing the partial half-section of the bipolar discharge-dissipation lightning air-terminals in accordance with the first embodiment of the present invention.

As shown in FIG. 1 and FIG. 2, the space charge dispersed lighting air-terminals 10 comprises: a base member 20 formed fixably at a top region of a protected building through a fixed bolt 21, including a coupling projection 22 on whose inner periphery surface coupling screw grooves 22a are formed and which is protruded and formed at a side upper surface of the base member, and a grounding piece 24 fastened releasably by a fastening screw 23 at a side opposite to the coupling projection 22 to ground an earth electrode and a grounded lightning conductor (not shown); a fixed piece 41 having fixed screw parts 41a formed at outer periphery surfaces of both ends thereof for screw-coupling with the coupling screw grooves 22a of the coupling projection 22 protruded-formed on the base member 20; a discharge member 40 having a supporting rod 45, including a connecting piece 42 on whose inner periphery surface connecting screw grooves 42a are formed and which is fixed to the supporting rod 45 through methods such as a welding or a forced inserting, and a plurality of discharge pins 43 which have a predetermined length and is fitted into an outer periphery surface of the supporting rod 45 in perpendicular to a longitudinal direction of the supporting rod 45 in order to allow it to disperse and discharge the earth charge following the thundercloud approach in a space spaced from a potential modifying unit 60 (will be described hereinafter), the supporting rod 45 being twisted to form a discharge part 44 having a spiral shape section of the discharge pins; a potential modifying unit 60; and a distance compensating member 70 in which a disc shape of distance compensating piece 70b has a tapered part 70a whose lower apex portion is inclined to maintain an isolated distance from the potential modifying unit 60 constant, and a projection piece 70e is protruded on the upper surface of the distance compensating piece 70b and integrated with the distance compensating piece 70b, the projection piece 70e having a fixed hole 70c formed in the center axis direction and a screw hole 70d formed at the outer periphery surface thereof so that the projection piece 70e is fixed through a coupling screw C by passing the discharge member 40 through.

The potential modifying unit 60 comprises, an conductive upper cap member 61 which is formed upper the discharge member 40 and have a hemisphere shape of section and in whose lower portion coupling grooves 61a are formed so that the upper cap member 61 is charged with different charges by electric dipole, bipolar and electric double layer action according to the thundercloud approach in order to disperse and discharge the earth charge in the space spaced from the discharge part 44; an dielectric isolated member 62 including a disc shape of isolated plate 62a on which the upper cap member 61 is rested, a through hole 62b formed in a center axis direction in a lower portion of the isolated plate 62a, and a pillar part 62d having a coupling screw part 62c formed on an outer periphery surface of the lower portion of the isolated plate 62a; a discharge assisting member 65 including a sheet type first discharge assisting member 63 and a second discharge assisting member 64 stacked together, wherein the first discharge assisting member 63 has a horizontal plate 63b on whose both sides surfaces a dielectric material layer A formed with epoxy resin material is formed and in whose center portion an inserting hole 63a is punched in order to increase a capacitance corresponding to the thundercloud approach, and an inclined plate 63c which is integrated with the first discharge assisting member 63 and is extended downwardly with an angle from 0° to 30 ° (preferably, 15°) from an apex portion of the horizontal plate 63b, and the second discharge assisting member 64 is molded with sheet type stainless steel or copper material for preventing rust and includes a flat plate part 64b having an inserting hole 64a punched in a center portion thereof to decrease a discharge beginning voltage of the earth voltage corresponding to the thundercloud approach, and an extended part 64c extended downwardly to have same angle with the angle of the inclined plate 63c of the first discharge assisting member 63 from an apex portion of the flat plate part 64b; a protecting member 66 molded with stainless steel or copper material to have approximately 1 mm thickness for preventing the discharge assisting member 65 from being damaged (distorted) due to an external force, for example, a wind (a squall) or a user' mistake upon mounting wherein the protecting member 66 includes a protecting horizontal plate 66b in whose center portion a protecting hole 66a is punched to allow it to insert between the lower surface of the isolated plate 62a of the isolated member 62 and the discharge assisting member 65, and a protecting inclined plate 66c integrated therewith and extended downwardly to have same angle with the angel of the extended piece 63c of the first discharge assisting member 63 from an apex portion of the protecting horizontal plate 66b; a discharge cap member 67 including a connecting piece 67b has a hole 67a in the center portion thereof to insert the pillar part 62d of the isolated member 62 through the center portion thereof and put it on the lower surface of the discharge assisting member 65, and an inclined piece 67c which is integrated with the discharge cap member 67 and is extended downwardly with a predetermined angle without contact with the upper surface of a distance compensating member 70 (will be described hereinafter) from an apex portion of the connecting piece 67b wherein the apex portion of the inclined piece 67c has a notch portion 67d formed for increasing the dispersing and discharging of the earth charge following the thundercloud approach; a coupling member 68 screw-coupled with the coupling screw part 62c formed on the outer periphery surface of the pillar part 62d of the isolated member 62 for passing the lower surface of the isolated plate 62a, that is, the pillar part 62d, through the center portion wherein the coupling member 68 has a screw hole 68a for pressing the protection member 66, the discharge assisting member 65 and the discharge cap member 67 to prevent them from separating from the pillar part 62d; and a connecting member 69 including a diameter-expanded part 69a formed in the lower end of the connecting member 69 for receiving and locking the pillar part 62d of the isolated member 62, a screw projection 69b protruded and formed on the upper portion of the connecting member 69 for fixing and connecting the upper cap member 61 rested on the upper surface of the isolated plate 62a through a screw coupling, an inserting groove 69c formed in the lower portion of the connecting member 69 for receiving the connecting piece 42 of the discharge member 40, and a screw hole 69d formed in the outer periphery surface of the diameter-expanded part 69a in a manner to communicate with the inserting groove 69c in order to press and fix the connecting piece 42 of the discharge member 40 inserted through a fixed screw B into the inserting groove 69c, wherein a diameter ratio of the discharge part 44, the discharge cap member 67, the isolated plate 62a of the isolated member 62 and the discharge assisting member 65 to the upper cap member 61 is 1:2:2:3:4 in the potential modifying unit 60.

The first discharge assisting member 63 of the discharge assist member 65 may have the dielectric material layer A applied on the both side surfaces thereof in order to increase a capacitance corresponding to the thundercloud approach. However, the first discharge assisting member is not limited to this, and may have the dielectric material layer A only on one side surface, or may use, for example, a dielectric paper thereon.

Figure 3:
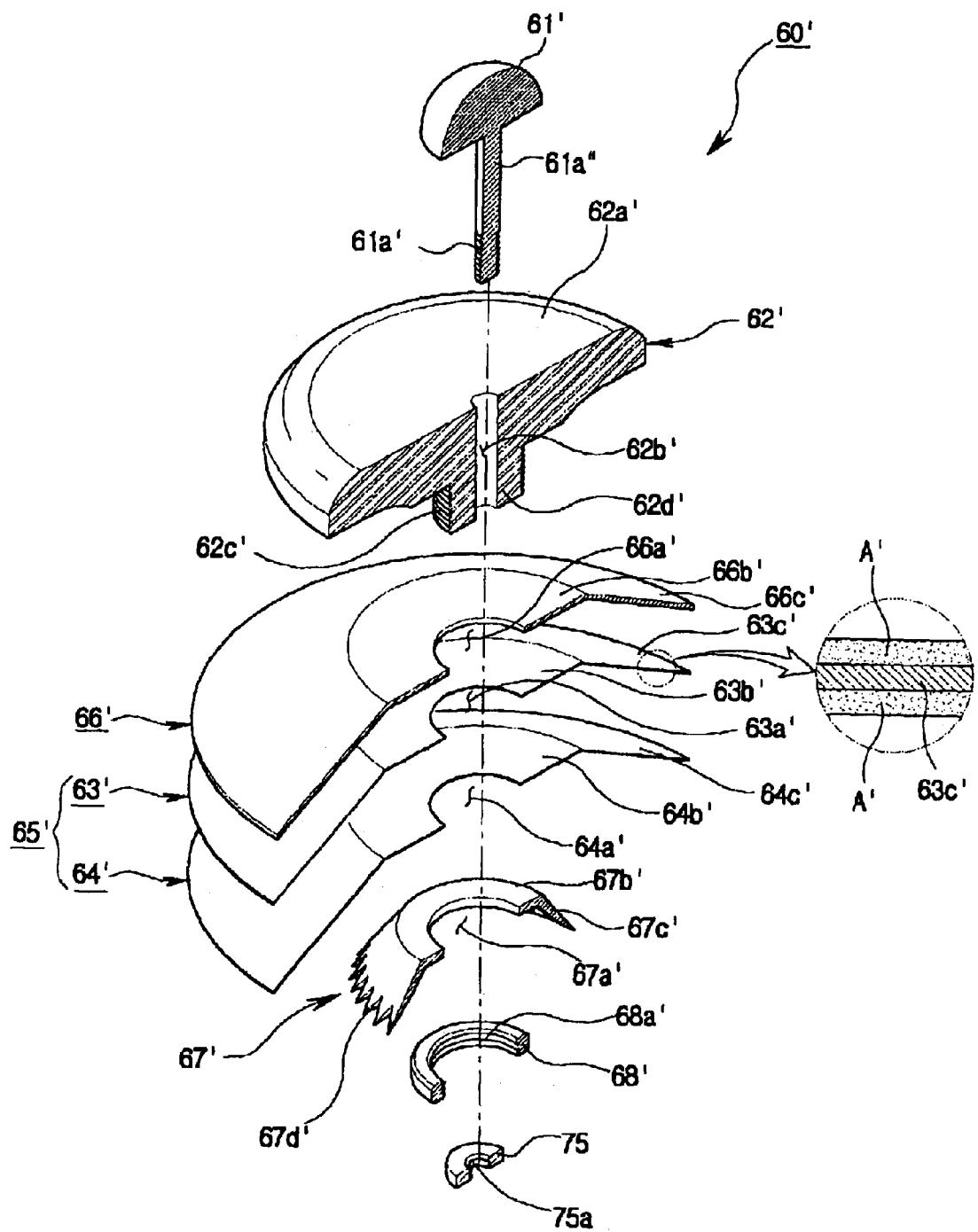
FIG. 3 is an exploded perspective view showing a half-section of a potential modifying unit of a bipolar discharge-dissipation lightning air-terminals in accordance with a second embodiment of the present invention.
Figure 4:
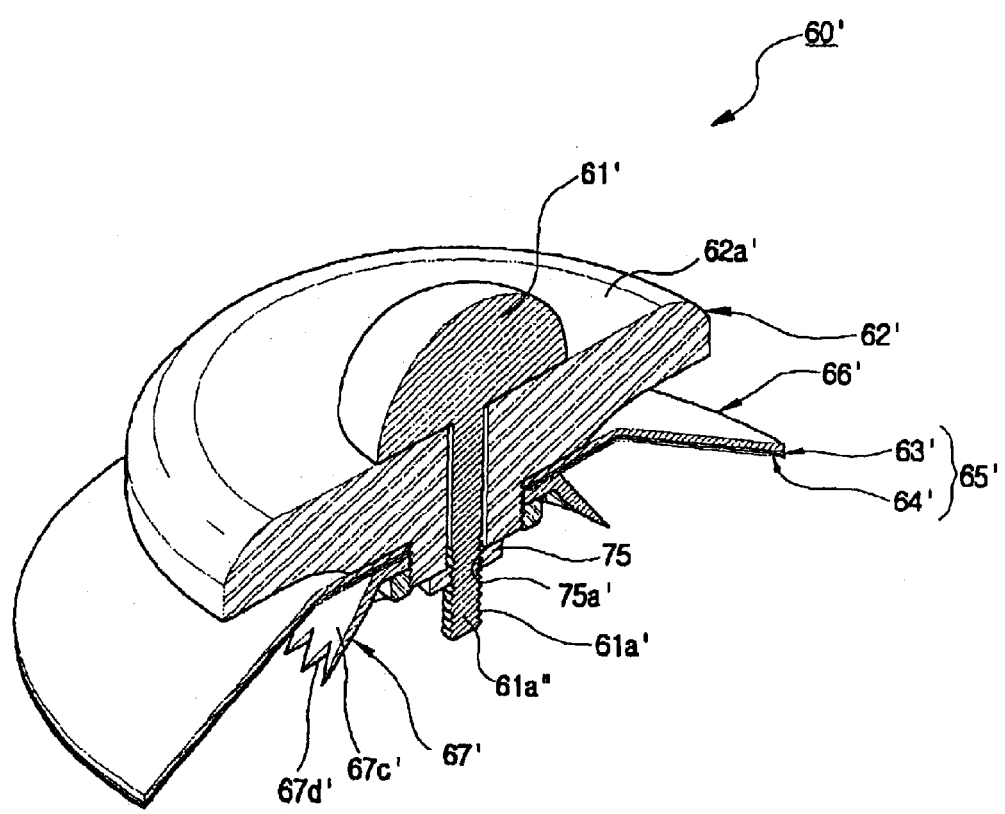
FIG. 4 is an assembled perspective view showing the half-section of the potential modifying unit of a bipolar discharge-dissipation lightning air-terminals in accordance with the second embodiment of the present invention.

On the other hand, in accordance with the bipolar discharge-dissipation lightning air-terminals 10 of the present invention, as shown in FIG. 1 and FIG. 2, the potential modifying unit 60 is fixed to the connecting piece 42 of the discharge member 40 through the connecting member 70 which includes the screw projection 70b protruded-formed on the upper surface thereof, the inserting groove 70c formed in the lower portion thereof and the diameter-expanded part 70a formed in the lower end of the outer periphery surface thereof. As shown in FIG. 3 and FIG. 4 without the connecting member 70, the potential modifying unit 60' comprises: an upper cap member 61' having a hemisphere shape of section wherein a connecting rod 61a" is integrated with the upper cap member 61' and protruded-formed from the upper cap member 61' in the lower portion of the upper cap member 61', and a connecting screw part 61a' is formed on the outer periphery surface of the lower portion of the connecting rod 61a'; an dielectric isolated member 62' in which an disc shape of isolated plate 62a' is formed for resting the upper cap member 61' thereon, wherein a through hole 62b' are formed in a center axis direction in the lower surface of the isolated plate 62a', and a pillar part 62d' having a coupling screw part 62c' formed on the outer periphery surface thereof is integrated with the isolated member 62' and protruded-formed from the isolated member 62'; a discharge assisting member 65' including a first discharge assisting member 63' and a second discharge assisting member 64' wherein the first discharge assisting member 63' includes a horizontal plate 63b' having a dielectric material layer A' applied on both side surfaces thereof, an inserting hole 63a' punched in the center portion thereof in order to increase a capacitance corresponding to the thundercloud approach, and an extended piece 63c' integrated with the first discharge assisting member 63' and extended downwardly from an apex portion of the horizontal plate 63a', and the second discharge assisting member 64' is molded with sheet type stainless steel or copper material for preventing rust and includes a flat plate part 64b' having an inserting hole 64a' punched in a center portion thereof to decrease a discharge beginning voltage of the earth voltage corresponding to the thundercloud approach and an extended part 64c' extended downwardly to have same angle with the angle of the extended piece 63c' of the first discharge assisting member 63' from an apex portion of the flat plate part 64b'; a protecting member 66' molded with stainless steel or copper material for preventing the sheet type discharge assisting member 65' from being damaged (distorted) due to an external force wherein the protecting member 66' includes a protecting horizontal plate 66b' in which a protecting hole 66a' is punched in the center portion thereof to allow it to insert between the lower surface of the isolated plate 62a' of the isolated member 62' and the discharge assisting member 65', and a protecting inclined plate 66c' integrated therewith and extended downwardly to have same angle with the angel of the extended piece 63c' of the first discharge assisting member 63' from an apex portion of the protecting horizontal plate 66b'; a discharge cap member 67' in which a connecting piece 67b' has a hole 67a' in the center portion thereof to insert the pillar part 62d' of the isolated member 62' through the center portion thereof and put it on the lower surface of the discharge assisting member 65', and an inclined piece 67c' is integrated with the discharge cap member 67' and is extended downwardly with a predetermined angle from an apex portion of the connecting piece 67b', the apex portion of the inclined piece 67c' having a notch portion 67d' formed to increase the dispersing and discharging of the earth charge due to the thundercloud approach; and a coupling member 68' screw-coupled with the coupling screw part 62c' formed on the outer periphery surface of the pillar part 62d' of the isolated member 62' for passing the lower surface of the isolated plate 62a', that is, the pillar part 62d', through the center portion, wherein the coupling member 68' has a screw hole 68a' for pressing the protection member 66', the discharge assisting member 65' and the discharge cap member 67' to prevent them from separating from the pillar part 62d', and wherein the upper cap member 61' is fixed and connected directly to the connecting piece 42 of the discharge member 40 through a locking piece 75 having the fixed screw hole 75a by being passed and inserted into the through hole 62b' of the isolated member 62' as shown in FIG. 1 and FIG. 2.

Figure 5:
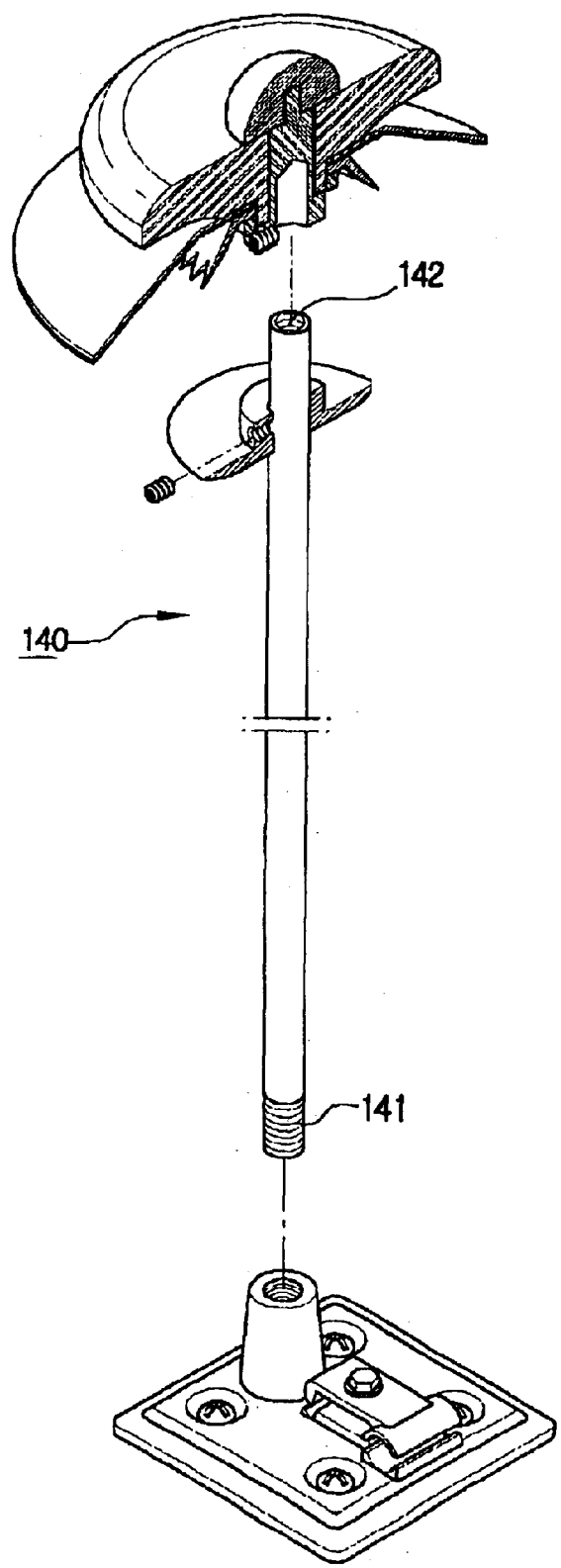
FIG. 5 is a view showing a bipolar discharge-dissipation lightning air-terminals in accordance with a third embodiment of the present invention.
Figure 6:
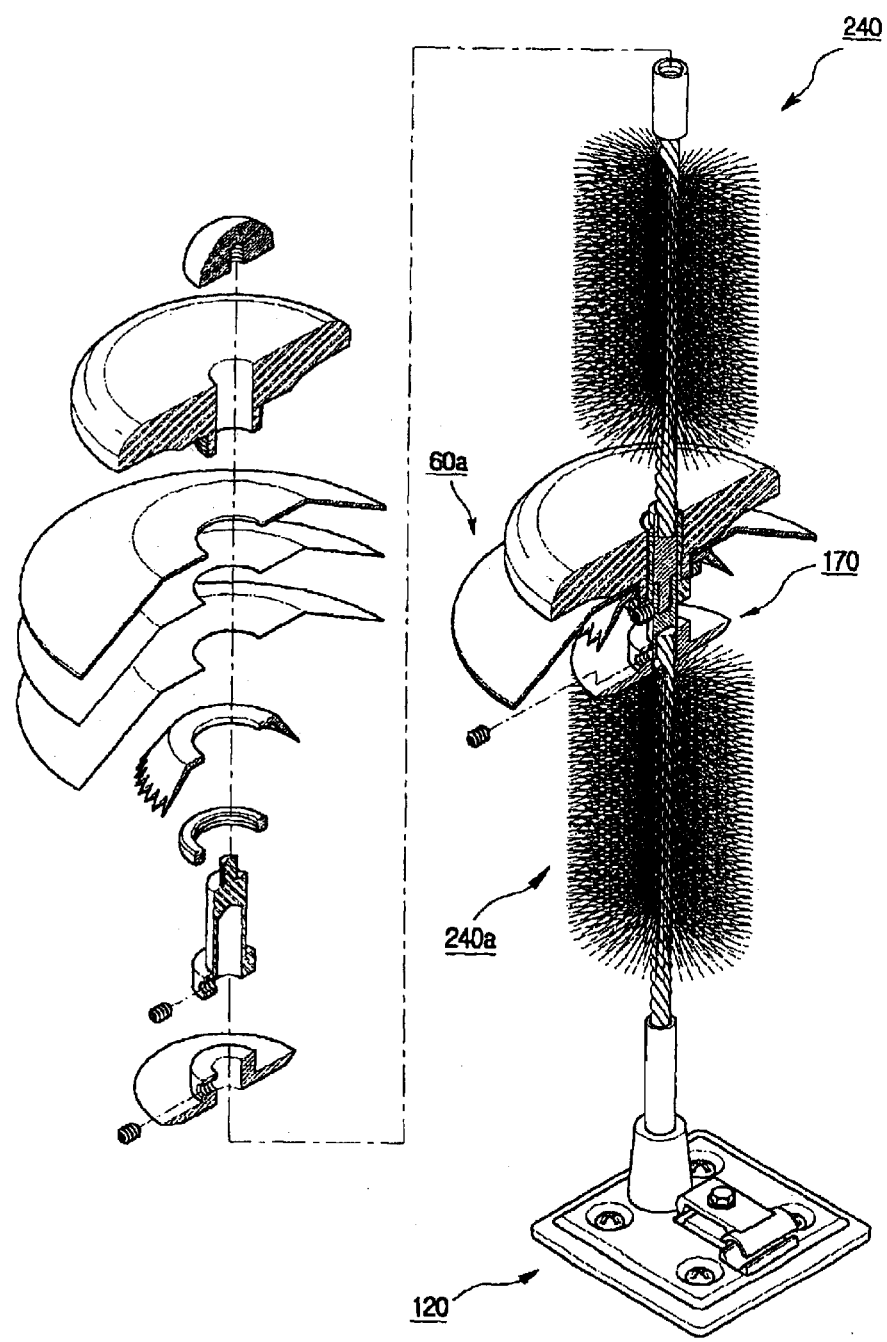
FIG. 6 is a view showing a bipolar discharge-dissipation lightning air-terminals in accordance with a fourth embodiment of the present invention.
Figure 7:
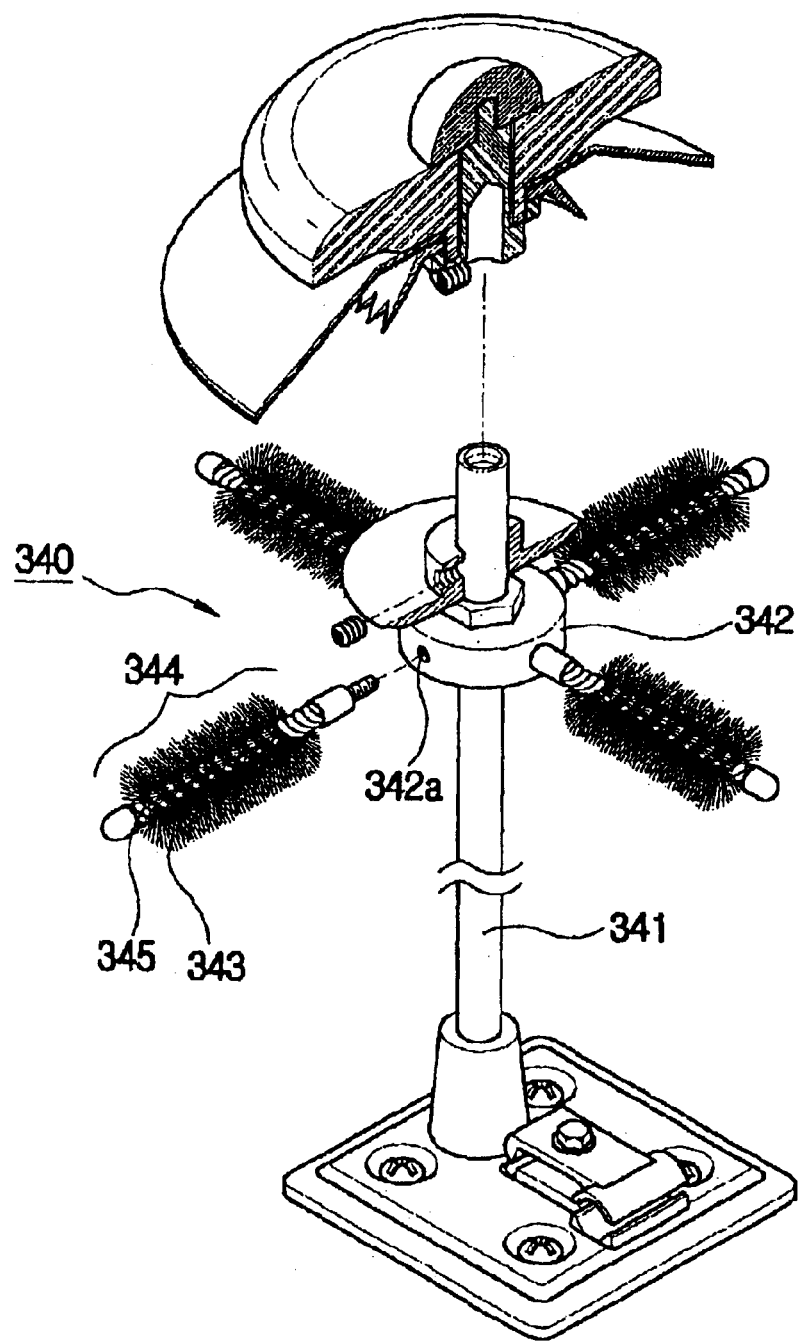
FIG. 7 is a view showing a bipolar discharge-dissipation lightning air-terminals in accordance with a fifth embodiment of the present invention.

Also, in accordance with the bipolar discharge-dissipation lightning air-terminals 10 of the present invention, the discharge member 40 has the supporting rod 45, including a connecting piece 42 on whose inner periphery surface connecting screw grooves 42a are formed and which is fixed to the supporting rod 45, and a plurality of discharge pins 43 which have a predetermined length and fit on the outer periphery surface of the supporting rod 45 in perpendicular to a longitudinal direction of the supporting rod 45 in order to allow it to disperse and discharge the earth charge following the thundercloud approach in the space spaced from the potential modifying unit 60, wherein the supporting rod is twisted to form the discharge part 44 having a spiral shape section of the discharge pins. However, as shown in FIG. 5, the discharge member may be a discharge member 140 on whose one end outer periphery surface a screw part 141 is formed and on whose other inner periphery surface a screw groove 142 is formed. Also, as shown in FIG. 6, the discharge member may be a discharge member 240 which sequentially further includes a discharge member 240a, a distance compensating member 170 and a potential modifying unit 60a in addition to a base member 120. In addition, as shown in FIG. 7, the discharge member may be a discharge member 340, which includes a fixed bar 341 having a fixed screw part (not shown) formed in one side outer periphery surface thereof, a fixed body 342 having a plurality of coupling holes 342a spaced by predetermined spaces on the outer periphery surface thereof while being fixed by passing and protruding the other side of the fixed bar 341 through the center portion thereof, and a supporting rod 345 whose respective ends are fixed respectively to the coupling holes 342a formed in the outer periphery surface of the fixed body 342 and in which a plurality of discharge pins 343 having a predetermined length are formed on the outer periphery surfaces thereof in perpendicular to a longitudinal direction of the supporting rod wherein the supporting rod is twisted to form a discharge part 344 having a spiral shape section of the discharge pins.

Figure 8:
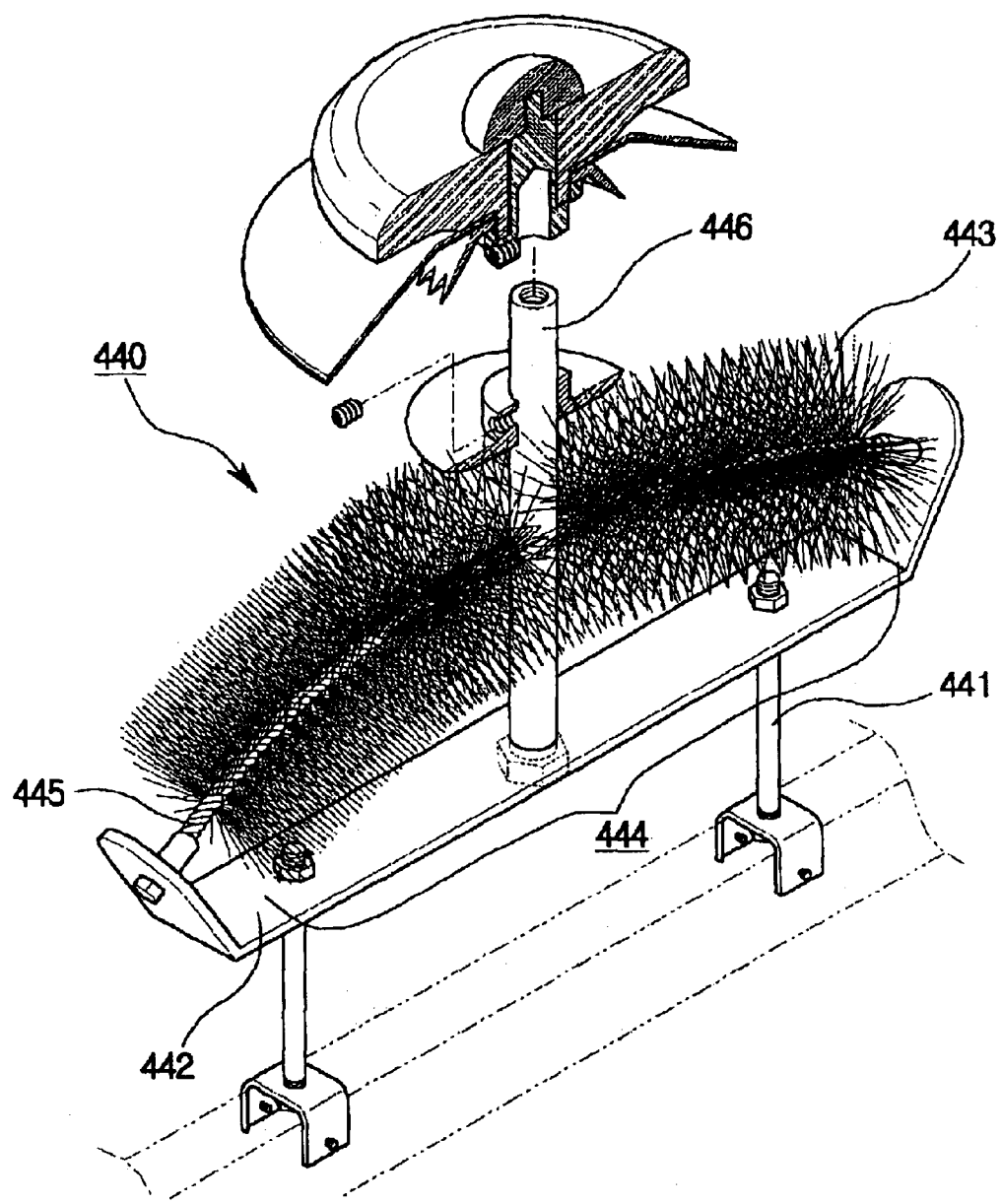
FIG. 8 is a view showing a bipolar discharge-dissipation lightning air-terminals in accordance with a sixth embodiment of the present invention.

Further, as shown in FIG. 8, the discharge member may be a discharge member 440 which includes a rested plate 442 fixed through a channel 441 for fixing, and a supporting rod 445 whose respective ends are fixed and connected to both end of the rested plate 442, whose center portion is curved and which has a plurality of discharge pins 443 having a predetermined length inserted on the outer periphery surface thereof in perpendicular to the longitudinal direction of the supporting rod 445 wherein the supporting rod 445 is twisted to form a discharge part 444 having a spiral shape section of the discharge pins, and a fixed rod 446 whose one end is fixed to the rested plate 442 and whose center portion is fixed and connected to the supporting rod 445.

Of course, at this time, it is preferable that the distance compensating member 70 as shown in FIG. 1 and FIG. 2 is fixed upper the discharge members 140, 240, 340 and 440 as shown in FIGS. 5 to 8.

In the case that the bipolar discharge-dissipation lightning air-terminals of the present invention is mounted on a protected object, as shown in FIG. 1 and FIG. 2, the discharge member 40 having the discharge part 44 on whose outer periphery surface a plurality of discharge pins 43 are twisted and formed to have a spiral shape of section, is built and fixed through the fixed screw part 41a of the fixed piece 41 coupled with the coupling screw grooves 22a of the coupling projection 22 of the base member 20, wherein the base member 20 is fixed on the top of the protected building by a fixed bolt 21 and has the ground piece 24 for grounding the earth electrode and the grounded lightning conductor at a side of the upper surface of the base member 20.

Then, after the connecting piece 42 fixed and connected to the top of the discharge member 40 is passed and inserted through the fixed hole 70c in order to maintain an isolated distance between the potential modifying unit 60 fixed to the top of the discharge member 40 and the discharge part 44 of the discharge member 40 constant, the upper surface of the discharge part 44 is pressed to fix the distance compensating member 70b through the coupling screw C toward the screw hole 70d of the projection piece 70e integrated with the distance compensating piece 70b and protruded from the upper surface of the distance compensating piece 70b, wherein the distance compensating piece 70b has the tapered part 70a whose lower surface apex portion is inclined.

As described above, the protecting member 66, the discharge assisting member 65 including the first discharge assisting member 63 having the dielectric material layer A applied on the both side surfaces thereof and the second discharge member 64, and the discharge cap member 67 having the notch part 67d formed at the apex portion thereof are applied sequentially by passing the pillar part 62d of the dielectric isolated member 62 through the center portion in the top of the discharge member 40 fixed to the coupling projection 22 of the base member 20. The coupling member 68 is screw-coupled with the coupling screw part 62c of the pillar part 62d to press and fix the protecting member 66, the discharge assisting member 65 and the discharge cap member 67. As the protecting member 66, the discharge assisting member 65 and the discharge cap member 67 are pressed and fixed by the coupling member 68, the connecting member 69 is inserted and locked toward the through hole 62d of the pillar part 62d. Then, the upper cap member 61 having the hemisphere section is rested on the upper surface of the isolated member 62 through the screw projection 69b protruded-formed on the top of the connecting member 69, and accordingly the connecting piece 42 of the discharge member 40 is inserted toward the inserting groove 69c formed in the connecting member 69. Then, the fixed screw B is screw-coupled with the screw hole 69d formed in the diameter-expanded part 69a to fix the potential modifying unit 60 and thereby an installation of the lightning air-terminals is completed.

In the case that the thundercloud approaches the bipolar discharge-dissipation lightning air-terminals 10 of the present invention installed as described above, (+) earth charge is focused on the distance compensating member 70 pressed and fixed on the upper cap member 61 of the potential modifying unit 60, the discharge member 40 and the discharge part 44 of the discharge member 40, and (−) charge opposite to the earth charge is charged on the discharge cap member 67 without contact with the upper cap member 61 and the distance compensating member 70 by the dielectric isolated member 150. The discharging of the earth charge following the thundercloud approach occurs in the space between the discharge cap member 67 and the distance compensating member 70. As a result, the earth potential value is decreased to an electric field below a flashover voltage.

Figure 9A:
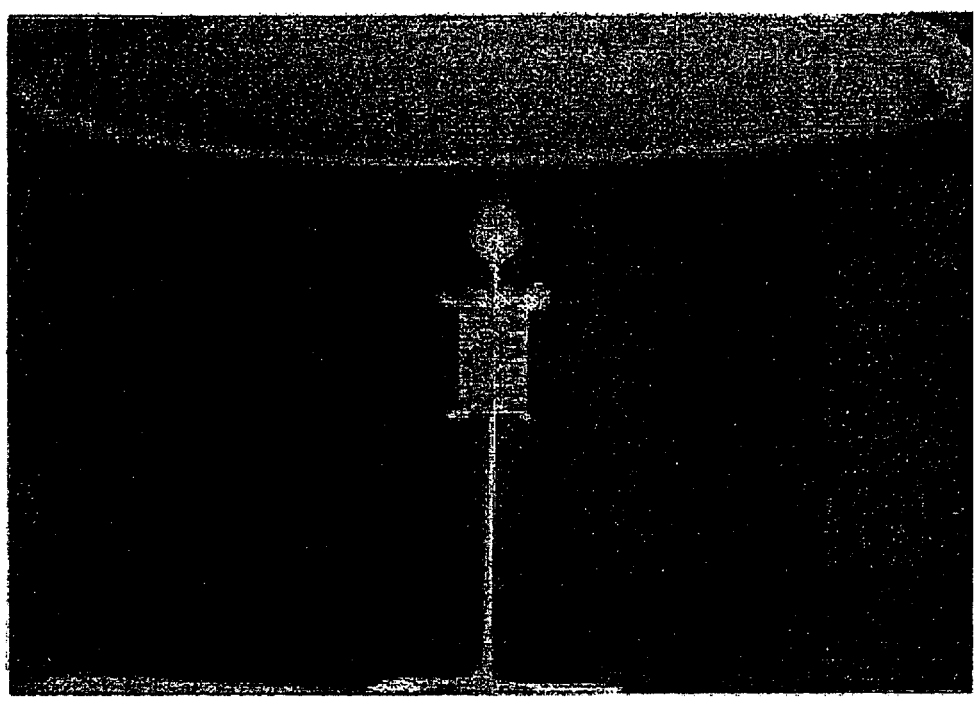
FIG. 9A is a picture in which a discharge phenomenon of a conventional brush type of lightning air-terminal is photographed.
Figure 9B:
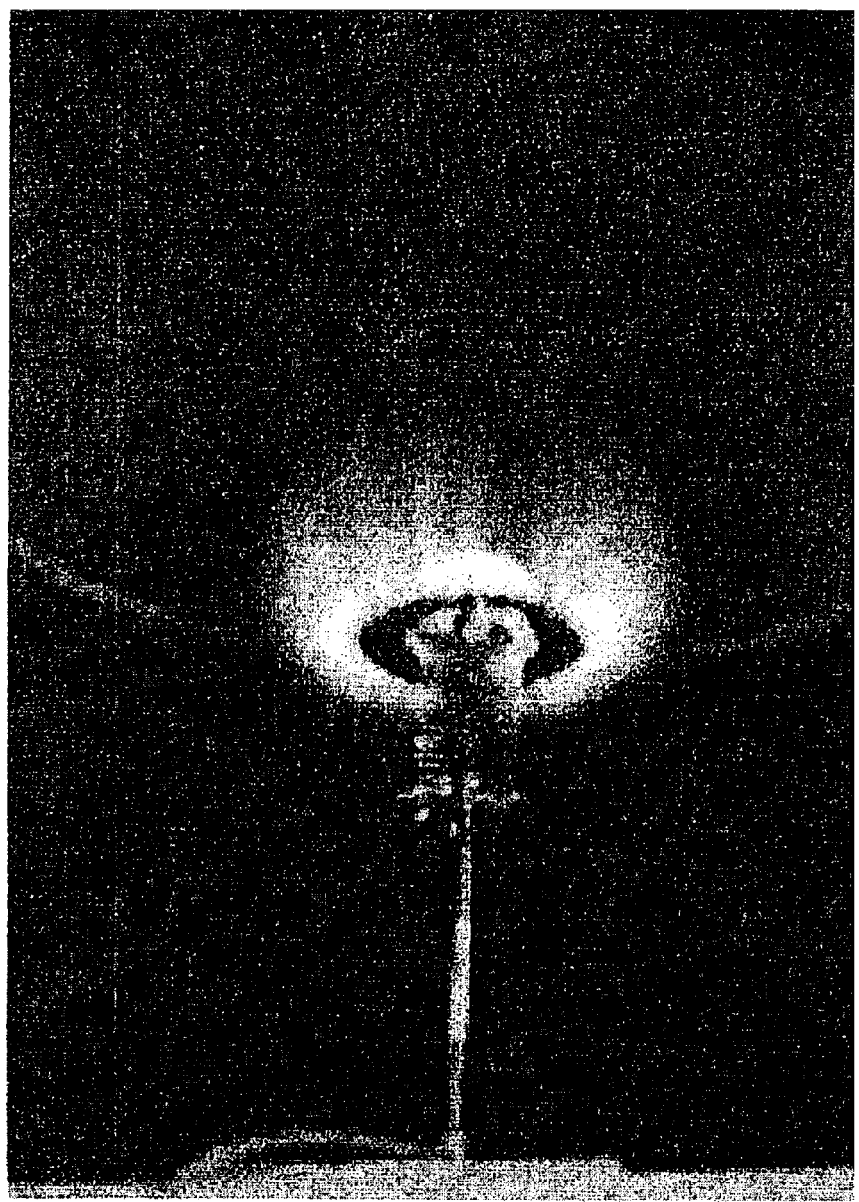
FIG. 9B is a picture in which a corona discharge phenomenon of the bipolar discharge-dissipation lightning air-terminal according to the present invention is photographed.

FIG. 9A is a picture in which a discharge phenomenon of a conventional brush type of lightning air-terminal has been photographed, wherein this photographing is performed by opening an iris of a camera for 15 seconds after −120 kV of DC voltage is applied to the lightning air-terminal. FIG. 9B is a picture in which a corona discharge phenomenon of the bipolar discharge-dissipation lightning air-terminal according to the present invention is photographed, wherein this photographing is performed by opening an iris of a camera for 15 seconds after −120 kV of DC voltage is applied to the lightning air-terminal in the case that a spaced distance between the potential modifying unit and the discharge member is 20 cm. As shown in the above pictures, the bipolar discharge-dissipation lightning air-terminal according to the present invention is more excellent than the conventional lightning air-terminal in efficiency of dispersing accumulated earth charges to the space.

As apparent from the above description, the bipolar discharge-dissipation lightning air-terminals of the present invention includes the dielectric isolated member on the distance compensating member which is fixed by pressing the upper surface of the discharge part, and the potential modifying unit having different charges by electric dipole, bipolar and electric double layer action. Therefore, a capacitance is increased corresponding to the thundercloud approach by the first discharge assisting member of the potential modifying unit. Also, the discharge beginning voltage of the earth voltage is lowered by the second discharge assisting member and the earth charge following the thundercloud approach is dispersed and discharged in the space separated between the upper surface of the distance compensating member fixed on the discharge part and the potential modifying unit. As a result, the earth potential value is decreased to the electric field below the flashover voltage to prevent the falling of the thunderbolt, thereby allowing it to protect telecommunication systems, low energy power products installed in a protected object, electronics products.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A bipolar discharge-dissipation lightning air-terminals comprising:

a base member fixed and installed in a top region of a protected object, including a coupling projection on whose inner periphery surface coupling screw grooves are formed, the coupling projection protruded and formed at side of an upper surface of the base member, and a grounding piece formed at a side opposite to the coupling projection in order to ground an earth electrode and a grounded lightning conductor;

a discharge member coupled releasably to the base member, for focusing an earth charge following a thundercloud approach on the upper surface of the base member; and a potential modifying unit attached releasably on the discharge member so that the potential modifying unit is charged with different charges by electric dipole, bipolar and electric double layer action according to a thundercloud approach in order to disperse and discharge the earth charge in a space spaced from the discharge member.

2. The bipolar discharge-dissipation lightning air-terminals according to claim 1, wherein the potential modifying unit comprises:

an upper cap member formed to have a hemisphere section, in whose lower surface coupling grooves are formed, the upper cap member being conductive;

an isolated member including a disc shape of isolated plate on which the upper cap member is located, a through hole formed in a center axis direction in a lower portion of the isolated plate, and a pillar part having a coupling screw part formed on an outer periphery surface of the lower portion of the isolated plate, the pillar part integrated with the isolated member in a manner to be protruded-formed from the isolated member, the isolated member being dielectric;

a discharge assisting member including a first discharge assisting member and a second discharge assisting member stacked together, the first discharge assisting member formed on the lower surface of the isolated member for increasing a capacitance, the second discharge assisting member including a flat plate part which has an inserting hole for receiving the pillar part punched in a center portion thereof to decrease a discharge beginning voltage of an earth voltage corresponding to the thundercloud approach and an extended part extended downwardly to have a predetermined angle from an apex portion of the flat plate part, the second discharge assisting member being sheet type;

a protecting member including a protecting horizontal plate which is fixed between the isolated plate of the isolated member and the discharge assisting member and in which a protecting hole is punched in a center portion thereof for preventing the discharge assisting member from being damaged by a external force, and a protecting inclined plate extended downwardly from the protecting horizontal plate;

a discharge cap member formed on a lower surface of the discharge assisting member, including a connecting piece having a hole formed in the center portion thereof, for dispersing and discharging the earth charge following the thundercloud approach in a space, and an inclined piece extended downwardly with a predetermined angle from the apex portion of the connecting piece, the discharge cap member being conductive;

a coupling member formed on a lower portion of the discharge cap member, which is screw-coupled with the pillar part of the isolated member for pressing and fixing the discharge assisting member and the discharge cap member, and in whose center portion a screw hole is formed; and a connecting member including a diameter-expanded portion formed in the lower end of an outer periphery surface of the connecting member for receiving and locking the pillar part of the isolated member, a screw projection protruding from the diameter-expanded portion for fixing and connecting the upper cap member rested on the upper surface of the isolated plate through a screw coupling on a upper surface of the connecting member, an inserting groove formed in a lower portion of the connecting member for inserting the upper portion of the discharge member, and a screw hole formed on an outer periphery surface of the diameter-expanded portion in a manner to communicate with the inserting groove in order to press and fix an upper portion of the discharge member inserted through a fixed screw into the inserting groove.

3. The bipolar discharge-dissipation lightning air-terminals according to claim 2, wherein the first discharge assisting member consists of a horizontal plate in whose center portion an inserting hole for inserting the pillar part is punched, and an inclined plate extended downwardly from the horizontal plate, and a dielectric material layer is applied on both side surfaces of the first discharge assisting member.

4. The bipolar discharge-dissipation lightning air-terminals according to claim 2, wherein the first discharge assisting member has a dielectric material layer applied on one side surface thereof.

5. The bipolar discharge-dissipation lightning air-terminals according to claim 3 or 4, wherein the dielectric material layer of the first discharge assisting member is epoxy resin.

6. The bipolar discharge-dissipation lightning air-terminals according to claim 2, wherein an apex portion of the inclined piece of the discharge cap member has a notch part formed to increase the dispersion and discharging of the earth charge following the thundercloud approach.

7. The bipolar discharge-dissipation lightning air-terminals according to claim 2, wherein the potential modifying unit is constructed so that a diameter ratio of the discharge part, the discharge cap member, the isolated plate of the isolated member and the discharge assisting member to the upper cap member is 1:2:2:3:4.

8. The bipolar discharge-dissipation lightning air-terminals according to claim 2, wherein the upper cap member of the potential modifying unit is formed to have a hemisphere shape of section for allowing it to rest on the isolated plate of the isolated member, and a connecting rod on whose outer periphery surface a connecting screw part is formed is integrated with the upper cap member and extruded-formed on the lower portion of the upper cap member for screw-coupling directly to the connecting piece of the discharge member through the pillar part of the isolated member.

9. The bipolar discharge-dissipation lightning air-terminals according to claim 2, wherein the discharge member comprises:
   a plurality of discharge pins;
   a supporting rod, to which a plurality of discharge pins are inserted in a perpendicular direction, the supporting rod being twisted to have a spiral shape section of the discharge pins in the state that the discharge pins are inserted into the supporting rod;
   a fixed piece fixed and connected to one end of the supporting rod, having a fixed screw part formed on an outer periphery surface thereof; and
   a connecting piece fixed and connected to the other end of the supporting rod, having a connecting screw groove formed on an inner periphery surface thereof.

10. The bipolar discharge-dissipation lighting air-terminals according to claim 2, wherein the discharge member is a pillar shape of rod, a screw part is formed on an outer periphery surface of one end of the distance compensating member and a screw groove is formed on an inner periphery surface of the other end of the discharge member.

11. The bipolar discharge-dissipation lightning air-terminals according to claim 10, further comprising, a distance compensating member including a disc shape of distance compensating piece and a projection piece integrated with the distance compensating piece and protruded on the upper surface of the distance compensating piece, wherein the distance compensation piece has a tapered part whose lower apex portion is inclined and the projection piece has a fixed hole formed in the center axis direction thereof and a screw hole formed in the outer periphery surface thereof so that the projection piece is fixed through a coupling screw by passing the discharge member through.

12. The bipolar discharge-dissipation lighting air-terminals according to claim 1, wherein the discharge member comprises:
   a plurality of discharge pins;
   a supporting rod, to which the plurality of discharge pins are inserted in a perpendicular direction, the supporting rod being twisted to have a spiral shape section of the discharge pins in the state that the discharge pins are inserted into the supporting rod;
   a fixed piece fixed and connected to one end of the supporting rod, having a fixed screw part formed on an outer periphery surface thereof; and
   a connecting piece fixed and connected to the other end of the supporting rod, having a connecting screw groove formed on an inner periphery surface thereof.

13. The bipolar discharge-dissipation lightning air-terminals according to claim 12, further comprising, a distance compensating member including a disc shape of distance compensating piece and a projection piece integrated with the distance compensating piece and protruded from an upper surface of the distance compensating piece, wherein the distance compensating piece has a tapered part whose lower apex portion is inclined, and the projection piece has a fixed hole formed in the center axis direction and a screw hole formed in an outer periphery surface thereof so that the projection piece is fixed through coupling screw by passing the discharge member through.

14. The bipolar discharge-dissipation lightning air-terminals according to claim 12, further comprising a potential modifying unit, a distance compensating member and a discharge member between the discharge member and the base member.

15. The bipolar discharge-dissipation lightning air-terminals according to claim 14, further comprising, a distance compensating member including a disc shape of distance compensating piece and a projection piece integrated with the distance compensating piece and protruded on the upper surface of the distance compensating piece, wherein the distance compensating piece has a tapered part whose lower apex portion is inclined and the projection piece has a fixed hole formed in the center axis direction thereof and a screw hole formed in the outer periphery surface thereof so that the projection piece is fixed through a coupling screw by passing the discharge member through.

16. The bipolar discharge-dissipation lightning air-terminals according to claim 12, wherein the discharge member comprises:
   a fixed bar on whose one end outer periphery surface a fixed screw part is formed;
   a fixed body protruded and fixed by passing the other end of the fixed bar through a center portion thereof, on whose outer periphery surface a plurality of coupling holes spaced by predetermined intervals are formed; and
   a supporting rod whose respective ends are fixed respectively to the coupling holes formed in the outer periphery surface of the fixed body and to whose outer periphery surface a plurality of discharge pins having a predetermined length are inserted in perpendicular to a longitudinal direction of the supporting rod, the supporting rod being twisted to form a discharge part having a spiral shape section of the discharge pins.

17. The bipolar discharge-dissipation lightning air-terminals according to claim 16, further comprising, a distance compensating member including a disc shape of distance compensating piece and a projection piece integrated with the distance compensating piece and protruded on the upper surface of the distance compensating piece, wherein the distance compensating piece has a tapered part whose lower apex portion is inclined and the projection piece has a fixed hole formed in the center axis direction thereof and a screw hole formed in the outer periphery surface thereof so that the projection piece is fixed through a coupling screw by passing the discharge member through.

18. The bipolar discharge-dissipation lightning air-terminals according to claim 12, wherein the discharge member comprises:
   a rested plate fixed through a fixed channel;
   a supporting rod whose respective ends are fixed and connected to both end of the rested plate, whose center portion is curved and to whose outer periphery surface a plurality of discharge pins having a predetermined length are inserted in perpendicular to the longitudinal direction of the supporting rod, the supporting rod being twisted to form a discharge part having a spiral shape section of the discharge pins; and
   a fixed rod whose one end is fixed on the rested plate and whose center portion is fixed and connected to the supporting rod to allow it to erect.

19. The bipolar discharge-dissipation lightning air-terminals according to claim 18, further comprising, a distance compensating member including a disc shape of distance compensating piece and a projection piece integrated with the distance compensating piece and protruded on the upper surface of the distance compensating piece, wherein the distance compensating piece has a tapered part whose lower apex portion is inclined and the projection piece has a fixed hole formed in the center axis direction thereof and a screw hole formed in the outer periphery surface thereof so that the projection piece is fixed through a coupling screw by passing the discharge member through.

* * * * *